United States Patent [19]

Hayes et al.

[11] 4,265,948
[45] * May 5, 1981

[54] COLLAPSIBLE DISPENSING TUBE

[75] Inventors: Thomas H. Hayes; Lewis C. Lo Maglio, both of Baton Rouge, La.

[73] Assignee: Ethyl Corporation, Richmond, Va.

[*] Notice: The portion of the term of this patent subsequent to Mar. 6, 1996, has been disclaimed.

[21] Appl. No.: 950,072

[22] Filed: Oct. 10, 1978

Related U.S. Application Data

[63] Continuation-in-part of Ser. No. 849,084, Nov. 7, 1977, Pat. No. 4,142,630.

[51] Int. Cl.³ .................... B65D 35/00; B65D 85/14
[52] U.S. Cl. .................... 428/35; 206/277; 206/524.2; 222/92; 428/461; 428/462; 428/463; 428/517; 428/520; 428/521; 428/911
[58] Field of Search ............ 428/35, 36, 458, 462, 428/463, 913, 517, 520, 521, 911, 519, 461; 260/879; 222/92, 215, 107; 206/524.2, 524.4, 277

[56] References Cited

U.S. PATENT DOCUMENTS

| | | | |
|---|---|---|---|
| 3,426,102 | 2/1969 | Solak et al. ............... | 260/879 |
| 3,936,334 | 2/1976 | Kushida et al. ............ | 428/35 X |
| 4,057,667 | 11/1977 | Wiggins et al. ........... | 428/35 |
| 4,073,400 | 2/1978 | Brook et al. .............. | 428/35 X |
| 4,113,539 | 9/1978 | Hotta et al. ............... | 428/35 X |
| 4,142,630 | 3/1979 | Hayes et al. .............. | 428/35 X |

Primary Examiner—Thomas J. Herbert, Jr.
Attorney, Agent, or Firm—Donald L. Johnson; John F. Sieberth; David L. Ray

[57] ABSTRACT

A collapsible dispensing container having a laminated tubular body, the laminated tubular body including a metal foil layer, and a layer of a copolymer resulting from the polymerization of 100 parts by weight of (a) at least 50 percent by weight of at least one nitrile having the structure

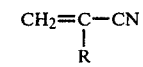

wherein R is hydrogen, a lower alkyl group having from 1 to 4 carbon atoms, or a halogen, and (b) up to 50 percent by weight based on the combined weight of (a) and (b) of an ester having the structure

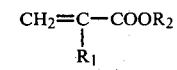

wherein $R_1$ is hydrogen, an alkyl group having from 1 to 4 carbon atoms or a halogen, and $R_2$ is an alkyl group having from 1 to 6 carbon atoms, in the presence of from 1 to 40 parts by weight of (c) a copolymer of a conjugated diene monomer selected from the group consisting of butadiene and isoprene and an olefinically unsaturated nitrile having the structure

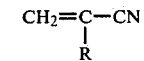

wherein R has the foregoing designation containing from 50 to 95 percent by weight of polymerized conjugated diene and from 50 to 5 percent by weight of polymerized olefinically unsaturated nitrile.

32 Claims, 4 Drawing Figures

COLLAPSIBLE DISPENSING TUBE

CROSS-REFERENCE TO RELATED APPLICATION

This application is a continuation-in-part of application Ser. No. 849,084, filed Nov. 7, 1977 now U.S. Pat. No. 4,142,630.

BACKGROUND OF THE INVENTION

The present invention relates to collapsible dispensing tubes and, more particularly, to tubes formed from a laminated material.

Collapsible dispensing tubes made of both metallic and plastic materials are well known. The metal tubes are generally impermeable to moisture and volatile oils and, therefore, are widely used for packaging pharmaceutical products, cosmetics, toiletries, and the like which contain these ingredients. They are also impervious to oxygen and hence, capable of protecting a container product against deterioration from this source.

However, the metal tubes such as are made from lead or aluminum are costly to produce due to the high material cost and the manner in which the tubes must be made. This includes individual printing of each tube with suitable decorative material after it has been formed. Moreover, the chemical nature of the metals used often makes necessary the extra step of completely coating the interior of the tube with a protective layer so as to preclude attack and corrosion of the metal be alkaline or acid contents resulting in contamination of the contents by the reaction products.

On the other hand, plastic tubes are relatively inert and are better suited for many products that attack metal. Unfortunately, the thin body wall of the plastics generally used is apt to be permeable, in varying degrees, to moisture, certain essential oils, perfumes, flavorings, and other volatile ingredients. Consequently, there is often a considerable loss of the volatile oils and moisture during storage, resulting in some deterioration or dehydration of contained products such as toothpaste, shaving cream, medicinal ointments, etc. Too, many plastics favored for plastic tube manufacture are oxygen permeable and are inferior to metal tubes in this respect.

Even where permeability is not a factor, plastic tubes have a further serious disadvantage in that printing or decorative material applied to the surface of the plastic will often not adhere readily, unless the plastic surface is first treated in some manner. This is an additional expense contributing to the cost of these tubes.

DESCRIPTION OF THE PREFERRED EMBODIMENTS

Figure 1:
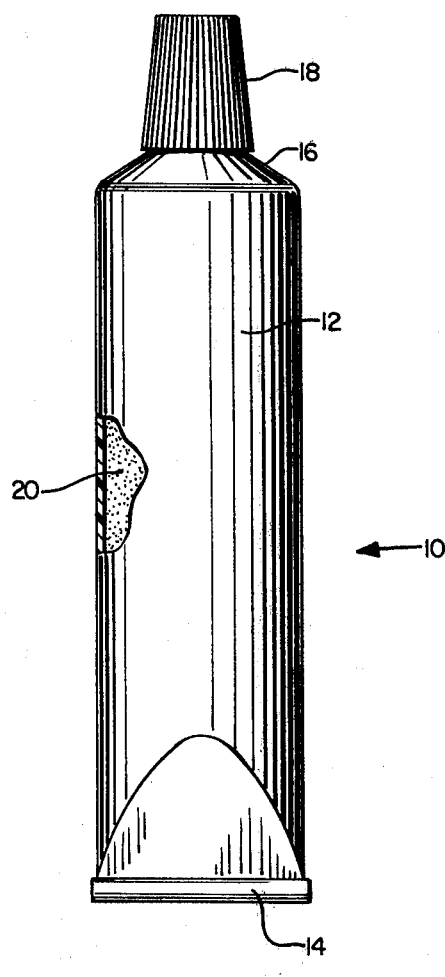
FIG. 1 is a side elevational view of a collapsible dispensing tube with a portion of the body broken away.

FIG. 1 shows a collapsible tube, generally designated by the numeral 10, having a tubular body 12 which has a longitudinally extending side seam (not shown). The side seam ordinarily is closed at one end after filling by heat sealing or other techniques as shown at 14. The tubular body 12 mounts at its opposite end a plastic headpiece 16 which is usually shaped to provide a threaded neck so that a cap 18 may be secured thereto when the tube 10 is filled with product 20. Headpiece 16 is preferably made from a material which can be fused by heat and/or pressure to lamina 23, or welded to lamina 23 by sonic welding, induction welding, or the like. However, other headpiece configurations may be employed without departing from the scope of the invention.

Figure 2:
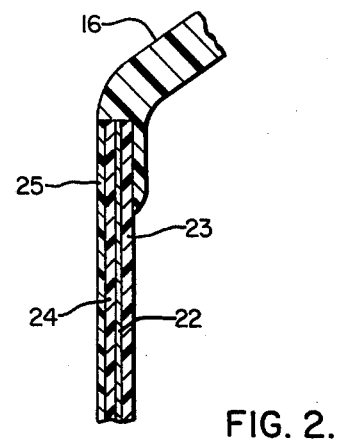
FIG. 2 is an enlarged, partially sectional view of the laminated tubular body.

The tubular body 12, as shown in FIG. 2, comprises a plurality of layers laminated or otherwise bonded one to the other. The body 12 comprises an intermediate foil layer 22 which provides the barrier protection against oxygen absorption from the atmosphere and essential oil permeation outwardly through the tube body 12. The thickness of this metallic foil is sufficient to impart the requisite barrier properties and yet is maintained relatively thin in the interest of cost and pliability of the container during use. Aluminum foil has been found particularly suitable for this use, although other metallic foil such as sheet steel or tin plate may also be utilized.

On the inside of foil layer 22 is a layer 23. Layer 23 is a flexible, thermoplastic polymer having a low permeability to fluids. The thermoplastic polymers having high barrier properties which may be used as layer 23 include the materials disclosed in U.S. Pat. No. 3,426,102, issued Feb. 4, 1969. The disclosures of this patent are herein incorporated and made part of this disclosure. The fluid barrier materials disclosed in this patent are those resulting from the polymerization of 100 parts by weight of (a) at least 50 percent by weight of at least one nitrile having the structure $$CH_2=C-CN$$
$$|$$
$$R$$

wherein R is hydrogen, a lower alkyl group having from 1 to 4 carbon atoms, or a halogen, and (b) up to 50 percent by weight based on the combined weight of (a) and (b) of an ester having the structure $$CH_2=C-COOR_2$$
$$|$$
$$R_1$$

wherein $R_1$ is hydrogen, an alkyl group having from 1 to 4 carbon atoms or a halogen, and $R_2$ is an alkyl group having from 1 to 6 carbon atoms, in the presence of from 1 to 40 parts by weight of (c) a copolymer of a conjugated diene monomer selected from the group consisting of butadiene and isoprene and an olefinically unsaturated nitrile having the structure $$CH_2=C-CN$$
$$|$$
$$R$$

wherein R has the foregoing designation containing from 50 to 95 percent by weight of polymerized conjugated diene and from 50 to 5 percent by weight of polymerized olefinically unsaturated nitrile.

Another preferred barrier material also disclosed in U.S. Pat. No. 3,426,102 is that prepared from the polymerization in aqueous medium of 100 parts by weight of a mixture of (a) from about 70 to 95 percent by weight of acrylonitrile and (b) from about 30 to about 5 percent by weight of methyl acrylate in the presence of from about 1 to about 20 parts by weight of (c) a copolymer of butadiene and acrylonitrile, said copolymer containing from about 60 to about 80 percent by weight of polymerized butadiene and from about 40 to about 20 percent by weight of polymerized acrylonitrile.

As previously stated, the olefinic nitrile in the composition is preferably acrylonitrile or methacrylonitrile or analogous polymers prepared from the higher nitriles and the diene-nitrile rubber comprises butadiene and acrylonitrile. As the relative amount of rubbery copolymer of butadiene and acrylonitrile is increased in the final polymeric product, the impact strength of the fluid barrier lamina increases and the gas and vapor barrier properties decrease somewhat. It is generally advantageous to use just enough of the rubber copolymer to impart the desired impact strength to the polymeric product and to retain the optimum gas and vapor barrier properties in the product. A suitable commercially available composition for making plastic bottles of the present invention, which are suitable for carbonated beverages and other uses, is that sold by the Standard Oil Company of Ohio under the trademark Barex 210, although other compositions are also satisfactory.

In each of the fluid barrier materials disclosed in U.S. Pat. No. 3,426,102, the ester (b) may be replaced by an ester having the structure

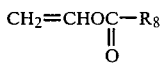

wherein $R_8$ has the foregoing designation. Examples of such esters are vinyl acetate, vinyl formate, vinyl propionate, vinyl butyrate, vinyl decanoate, vinyl benzoate, and the like.

Also, in each of the fluid barrier materials disclosed in U.S. Pat. No., 3,426,102, from about 5 to about 50 weight percent of the nitrile monomer may be replaced with a dicyanobutene monomer, such as 1,3-dicyano-1-butene, 1,4-dicyano-1-butene, or 2,4-dicyano-1-butene, or a mixture of two or more of these isomers. The mixture can be grafted onto an elastomeric substrate in the same manner disclosed for grafting the nitrile monomer in U.S. Pat. No. 3,426,102.

On the outside of foil layer 22 is preferably a polyolefin, generally taking the form of a low density polyethylene. However, other materials such as polypropylene, polybutylene, and the like may be used.

On the outside of the tubular body is layer 25 which is bonded to layer 24. Layer 25 is a material identical in composition to layer 23. Outer layer 25 is substantially transparent and forms the exterior surface of the tube. Layer 25 serves to protect the tube body 12 from abuse during handling and also to effectively seal the laminated collapsible tube 10 from absorbing any liquids that may come in contact with its exterior surface. It is thus readily apparent that any decoration or indicia (not shown) that may be placed on the surface of layer 24 will be protected and be visible through the clear layer 25. Of course, indicia could be printed on layer 24 before the laminate material is formed into the tubular body 10, thus permitting greater versatility and economy than is ordinary in preformed tube bodies.

Layer 23 prevents the foil layer 22 from chemically reacting with the contents of the tube. Furthermore, layer 23 will not absorb the various oils or other chemicals contained in product 20.

In another embodiment of the invention (not shown) the outer layer 25 may be deleted.

Figure 3:
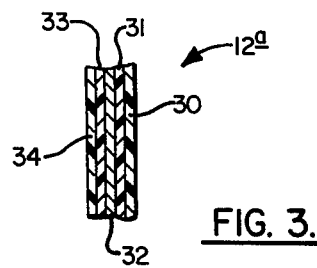
FIG. 3 is a cross-sectional view of an alternate laminated tubular body.

In FIG. 3 is shown an alternate laminate, generally indicated by the numeral 12a, which may be used in place of the laminated structure shown in FIG. 2 for making the tubular body 12. The laminate shown in FIG. 3 comprises a plurality of layers laminated or bonded one to the other and includes an intermediate foil layer 32 which provides the barrier protection against oxygen absorption from the atmosphere and essential permeation outwardly through the tube body 12. The thickness of this metallic foil is sufficient to impart the requisite barrier properties and yet is maintained relatively thin in the interest of cost and pliability of the container during use. Aluminum foil has been found particularly suitable for this use although other metallic foil such as sheet steel or tin plate may also be utilized.

The inside layer 30 of body 12a and the outside layer 34 are made from polymers identical to the polymers from which layer 23 is made. Layers 31 and 33 of body 12a are identical in composition and are preferably made from a polyolefin, generally taking the form of low density polyethylene. However, layers 31 and 33 could be made from other materials such as polypropylene, polybutylene, and the like.

Figure 4:
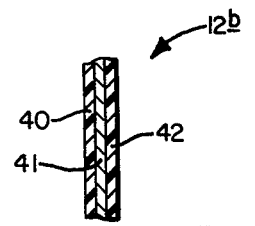
FIG. 4 is a cross-sectional view of an alternate laminated tubular body.

An additional alternate laminate from which tubular body 12 could be made is shown in FIG. 4 and is generally indicated by the numeral 12b. Laminate 12b includes an aluminum foil layer 41 identical to layers 32 and 22 previously described and has on the outside and inside thereof layers 40 and 42 which are both composed of polymers identical to the polymers from which layer 23 is made.

In all the embodiments of the invention the headpiece 16 is preferably made from a polymer which is identical in composition to the polymer from which layer 23 is made. Such polymers are flexible thermoplastic polymers which have a low permeability to fluids and prevent significant oxygen absorption from the atmosphere and essential oil permeation outwardly through the container.

The various lamina may be joined by any conventional technique. Exemplary of these techniques are gluing, co-extruding, and the like.

I claim:

1. A collapsible dispensing container having a laminated tubular body, said laminated tubular body including a fluid impervious metal foil lamination, a layer of a polyolefin on the outside of said metal foil lamination, and, on the inside of said metal foil lamination and on the outside of said polyolefin layer, a layer of a copolymer resulting from the polymerization of 100 parts by weight of a mixture of (a) from 70 to 95 percent by weight of acrylonitrile, and (b) from 30 to 5 percent by weight of methyl acrylate in the presence of from 1 to 20 parts by weight of (c) a copolymer containing from 60 to 80 percent by weight of polymerized butadiene and from 40 to 20 percent by weight of polymerized acrylonitrile, said collapsible dispensing tube having connected thereto headpiece means made from a copolymer resulting from the polymerization of 100 parts by weight of (a) at least 50 percent by weight of at least one nitrile having the structure $$CH_2=C-CN$$
$$\mid$$
$$R$$

wherein R is hydrogen, a lower alkyl group having from 1 to 4 carbon atoms, or a halogen, and (b) up to 50 percent by weight based on the combined weight of (a) and (b) of an ester having the structure $$CH_2=C-COOR_2$$
$$\mid$$
$$R_1$$

wherein $R_1$ is hydrogen, an alkyl group having from 1 to 4 carbon atoms, or a halogen, and $R_2$ is an alkyl group having from 1 to 6 carbon atoms, in the presence of from 1 to 40 parts by weight of (c) a copolymer of a conjugated diene monomer selected from the group consisting of butadiene and isoprene and an olefinically unsaturated nitrile having the structure $$CH_2=C-CN$$
$$\mid$$
$$R$$

wherein R has the foregoing designation containing from 50 to 95 percent by weight of polymerized conjugated diene and from 50 to 5 percent by weight of polymerized olefinically unsaturated nitrile.

2. A collapsible dispensing container having a laminated tubular body, said laminated tubular body including a fluid impervious metal foil lamination, a layer of a polyolefin on the outside of said metal foil lamination, and, on the inside of said metal foil lamination, a layer of a copolymer resulting from the polymerization of 100 parts by weight of a mixture of (a) from 70 to 95 percent by weight of acrylonitrile, and (b) from 30 to 5 percent by weight of methyl acrylate in the presence of from 1 to 20 parts by weight of (c) a copolymer of butadiene and acrylonitrile, said copolymer containing from 60 to 80 percent by weight of polymerized butadiene and from 40 to 20 percent by weight of polymerized acrylonitrile, said collapsible dispensing tube having connected thereto headpiece means made from a copolymer resulting from the polymerization of 100 parts by weight of (a) at least 50 percent by weight of at least one nitrile having the structure $$CH_2=C-CN$$
$$\mid$$
$$R$$

wherein R is hydrogen, a lower alkyl group having from 1 to 4 carbon atoms, or a halogen, and (b) up to 50 percent by weight based on the combined weight of (a) and (b) of an ester having the structure $$CH_2=C-COOR_2$$
$$\mid$$
$$R_1$$

wherein $R_1$ is hydrogen, an alkyl group having from 1 to 4 carbon atoms, or a halogen, and $R_2$ is an alkyl group having from 1 to 6 carbon atoms, in the presence of from 1 to 40 parts by weight of (c) a copolymer of a conjugated diene monomer selected from the group consisting of butadiene and isoprene and an olefinically unsaturated nitrile having the structure $$CH_2=C-CN$$
$$\mid$$
$$R$$

wherein R has the foregoing designation containing from 50 to 95 percent by weight of polymerized conjugated diene and from 50 to 5 percent by weight of polymerized olefinically unsaturated nitrile.

3. A collapsible dispensing container having a laminated tubular body, said laminated tubular body including a fluid impervious metal foil lamination, a layer of a polyolefin on the inside and outside of said metal foil lamination, and, on the outside of both of said polyolefin layers, a layer of a copolymer resulting from the polymerization of 100 parts by weight of a mixture of (a) from 70 to 95 percent by weight of acrylonitrile, and (b) from 30 to 5 percent by weight of methyl acrylate in the presence of from 1 to 20 parts by weight of (c) a copolymer of butadiene and acrylonitrile, said copolymer containing from 60 to 80 percent by weight of polymerized butadiene and from 40 to 20 percent by weight of polymerized acrylonitrile, said collapsible dispensing tube having connected thereto headpiece means made from a copolymer resulting from the polymerization of 100 parts by weight of (a) at least 50 percent by weight of at least one nitrile having the structure $$CH_2=C-CN$$
$$\mid$$
$$R$$

wherein R is hydrogen, a lower alkyl group having from 1 to 4 carbon atoms, or a halogen, and (b) up to 50 percent by weight based on the combined weight of (a) and (b) of an ester having the structure $$CH_2=C-COOR_2$$
$$\mid$$
$$R_1$$

wherein $R_1$ is hydrogen, an alkyl group having from 1 to 4 carbon atoms, or a halogen, and $R_2$ is an alkyl group having from 1 to 6 carbon atoms, in the presence of from 1 to 40 parts by weight of (c) a copolymer of a conjugated diene monomer selected from the group consisting of butadiene and isoprene and an olefinically unsaturated nitrile having the structure $$CH_2=C-CN$$
$$\mid$$
$$R$$

wherein R has the foregoing designation containing from 50 to 95 percent by weight of polymerized conjugated diene and from 50 to 5 percent by weight of polymerized olefinically unsaturated nitrile.

4. A collapsible dispensing container having a laminated tubular body, said laminated tubular body including a fluid impervious metal foil lamination, and, on the inside and outside of said metal foil lamination, a layer of a copolymer resulting from the polymerization of 100 parts by weight of a mixture of (a) from 70 to 95 percent by weight of acrylonitrile, and (b) from 30 to 5 percent by weight of methyl acrylate in the presence of from 1 to 20 parts by weight of (c) a copolymer of butadiene and acrylonitrile, said copolymer containing from 60 to 80 percent by weight of polymerized butadiene and from 40 to 20 percent by weight of polymerized acrylonitrile, said collapsible dispensing tube having connected thereto headpiece means made from a copolymer resulting from the polymerization of 100 parts by weight of (a) at least 50 percent by weight of at least one nitrile having the structure

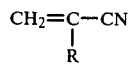

wherein R is hydrogen, a lower alkyl group having from 1 to 4 carbon atoms, or a halogen, and (b) up to 50 percent by weight based on the combined weight of (a) and (b) of an ester having the structure

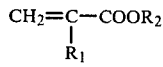

wherein $R_1$ is hydrogen, an alkyl group having from 1 to 4 carbon atoms, or a halogen, and $R_2$ is an alkyl group having from 1 to 6 carbon atoms, in the presence of from 1 to 40 parts by weight of (c) a copolymer of a conjugated diene monomer selected from the group consisting of butadiene and isoprene and an olefinically unsaturated nitrile having the structure

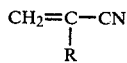

wherein R has the foregoing designation containing from 50 to 95 percent by weight of polymerized conjugated diene and from 50 to 5 percent by weight of polymerized olefinically unsaturated nitrile.

5. A collapsible dispensing container having a laminated tubular body, said laminated tubular body including a fluid impervious metal foil lamination, a layer of a polyolefin on the outside of said metal foil lamination, and, on the inside of said metal foil lamination and on the outside of said polyolefin layer, a layer of a copolymer resulting from the polymerization of 100 parts by weight of (a) at least 50 percent by weight of at least one nitrile having the structure

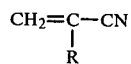

wherein R is hydrogen, a lower alkyl group having from 1 to 4 carbon atoms, or a halogen, and (b) up to 50 percent by weight based on the combined weight of (a) and (b) of an ester having the structure

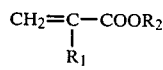

wherein $R_1$ is hydrogen, an alkyl group having from 1 to 4 carbon atoms, or a halogen, and $R_2$ is an alkyl group having from 1 to 6 carbon atoms, in the presence of from 1 to 40 parts by weight of (c) a copolymer of a conjugated diene monomer selected from the group consisting of butadiene and isoprene and an olefinically unsaturated nitrile having the structure

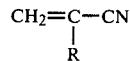

wherein R has the foregoing designation containing from 50 to 95 percent by weight of polymerized conjugated diene and from 50 to 5 percent by weight of polymerized olefinically unsaturated nitrile, said collapsible dispensing container having connected thereto headpiece means made from a copolymer resulting from the polymerization of 100 parts by weight of (a) at least 50 percent by weight of at least one nitrile having the structure

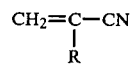

wherein R is hydrogen, a lower alkyl group having from 1 to 4 carbon atoms, or a halogen, and (b) up to 50 percent by weight based on the combined weight of (a) and (b) of an ester having the structure

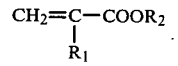

wherein $R_1$ is hydrogen, an alkyl group having from 1 to 4 carbon atoms, or a halogen, and $R_2$ is an alkyl group having from 1 to 6 carbon atoms, in the presence of from 1 to 40 parts by weight of (c) a copolymer of a conjugated diene monomer selected from the group consisting of butadiene and isoprene and an olefinically unsaturated nitrile having the structure

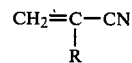

wherein R has the foregoing designation containing from 50 to 95 percent by weight of polymerized conjugated diene and from 50 to 5 percent by weight of polymerized olefinically unsaturated nitrile.

6. The composition of claim 5 wherein the (a) component of the laminated tubular body is methacrylonitrile.

7. The composition of claim 6 wherein there is employed 100 percent by weight of the (a) component of the laminated tubular body.

8. The composition of claim 5 wherein the (a) component of the laminated tubular body is acrylonitrile.

9. The composition of claim 8 wherein the (b) component of the laminated tubular body is ethyl acrylate.

10. The composition of claim 8 wherein the (b) component of the laminated tubular body is methyl acrylate.

11. The composition of claim 10 wherein, in the laminated tubular body, there is employed a mixture of 75 percent by weight of the (a) component and 25 percent by weight of the (b) component.

12. A collapsible dispensing container having a laminated tubular body, said laminated tubular body including a fluid impervious metal foil lamination, a layer of a polyolefin on the outside of said metal foil lamination, and, on the inside of said metal foil lamination, a layer of a copolymer resulting from the polymerization of 100 parts by weight of (a) at least 50 percent by weight of at least one nitrile having the structure

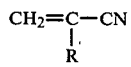

wherein R is hydrogen, a lower alkyl group having from 1 to 4 carbon atoms, or a halogen, and (b) up to 50 percent by weight based on the combined weight of (a) and (b) of an ester having the structure

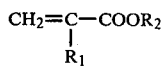

wherein $R_1$ is hydrogen, an alkyl group having from 1 to 4 carbon atoms, or a halogen, and $R_2$ is an alkyl group having from 1 to 6 carbon atoms, in the presence of from 1 to 40 parts by weight of (c) a copolymer of a conjugated diene monomer selected from the group consisting of butadiene and isoprene and an olefinically unsaturated nitrile having the structure

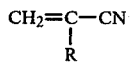

wherein R has the foregoing designation containing from 50 to 95 percent by weight of polymerized conjugated diene and from 50 to 5 percent by weight of polymerized olefinically unsaturated nitrile, said collapsible dispensing tube having connected thereto headpiece means made from a copolymer resulting from the polymerization of 100 parts by weight of (a) at least 50 percent by weight of at least one nitrile having the structure

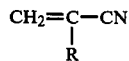

wherein R is hydrogen, a lower alkyl group having from 1 to 4 carbon atoms, or a halogen, and (b) up to 50 percent by weight based on the combined weight of (a) and (b) of an ester having the structure

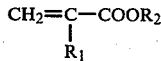

wherein $R_1$ is hydrogen, an alkyl group having from 1 to 4 carbon atoms, or a halogen, and $R_2$ is an alkyl group having from 1 to 6 carbon atoms, in the presence of from 1 to 40 parts by weight of (c) a copolymer of a conjugated diene monomer selected from the group consisting of butadiene and isoprene and an olefinically unsaturated nitrile having the structure

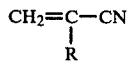

wherein R has the foregoing designation containing from 50 to 95 percent by weight of polymerized conjugated diene and from 50 to 5 percent by weight of polymerized olefinically unsaturated nitrile.

13. The composition of claim 12 wherein the (a) component of the laminated tubular body is methacrylonitrile.

14. The composition of claim 13 wherein there is employed 100 percent by weight of the (a) component of the tubular laminated body.

15. The composition of claim 12 wherein the (a) component of the laminated tubular body is acrylonitrile.

16. The composition of claim 15 wherein the (b) component of the laminated tubular body is ethyl acrylate.

17. The composition of claim 15 wherein the (b) component of the laminated tubular body is methyl acrylate.

18. The composition of claim 17 wherein, in the laminated tubular body, there is employed a mixture of 75 percent by weight of the (a) component and 25 percent by weight of the (b) component.

19. A collapsible dispensing container having a laminated tubular body, said laminated tubular body including a fluid impervious metal foil lamination, a layer of a polyolefin on the inside and outside of said metal foil lamination, and, on the outside of both of said polyolefin layers, a layer of a copolymer resulting from the polymerization of 100 parts by weight of (a) at least 50 percent by weight of at least one nitrile having the structure

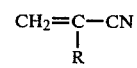

wherein R is hydrogen, a lower alkyl group having from 1 to 4 carbon atoms, or a halogen, and (b) up to 50 percent by weight based on the combined weight of (a) and (b) of an ester having the structure

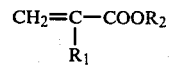

wherein $R_1$ is hydrogen, an alkyl group having from 1 to 4 carbon atoms, or a halogen, and $R_2$ is an alkyl group having from 1 to 6 carbon atoms, in the presence of from 1 to 40 parts by weight of (c) a copolymer of a conjugated diene monomer selected from the group consisting of butadiene and isoprene and an olefinically unsaturated nitrile having the structure

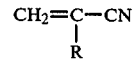

wherein R has the foregoing designation containing from 50 to 95 percent by weight of polymerized conjugated diene and from 50 to 5 percent by weight of polymerized olefinically unsaturated nitrile, said collapsible dispensing tube having connected thereto headpiece means made from a copolymer resulting from the polymerization of 100 parts by weight of (a) at least 50 percent by weight of at least one nitrile having the structure

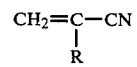

wherein R is hydrogen, a lower alkyl group having from 1 to 4 carbon atoms, or a halogen, and (b) up to 50 percent by weight based on the combined weight of (a) and (b) of an ester having the structure

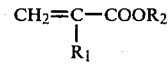

wherein $R_1$ is hydrogen, an alkyl group having from 1 to 4 carbon atoms, or a halogen, and $R_2$ is an alkyl group having from 1 to 6 carbon atoms, in the presence of from 1 to 40 parts by weight of (c) a copolymer of a conjugated diene monomer selected from the group consisting of butadiene and isoprene and an olefinically unsaturated nitrile having the structure

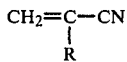

wherein R has the foregoing designation containing from 50 to 95 percent by weight of polymerized conjugated diene and from 50 to 5 percent by weight of polymerized olefinically unsaturated nitrile.

20. The composition of claim 19 wherein the (a) component of the laminated tubular body is methacrylonitrile.

21. The composition of claim 20 wherein there is employed 100 percent by weight of the (a) component of the laminated tubular body.

22. The composition of claim 19 wherein the (a) component of the laminated tubular body is acrylonitrile.

23. The composition of claim 22 wherein the (b) component of the laminated tubular body is ethyl acrylate.

24. The composition of claim 22 wherein the (b) component of the laminated tubular body is methyl acrylate.

25. The composition of claim 24 wherein, in the laminated tubular body, there is employed a mixture of 75 percent by weight of the (a) component and 25 percent by weight of the (b) component.

26. A collapsible dispensing container having a laminated tubular body, said laminated tubular body including a fluid impervious metal foil lamination, and, on the inside and outside of said metal foil lamination, a layer of a copolymer resulting from the polymerization of 100 parts by weight of (a) at least 50 percent by weight of at least one nitrile having the structure

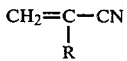

wherein R is hydrogen, a lower alkyl group having from 1 to 4 carbon atoms, or a halogen, and (b) up to 50 percent by weight based on the combined weight of (a) and (b) of an ester having the structure

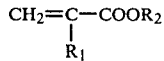

wherein $R_1$ is hydrogen, an alkyl group having from 1 to 4 carbon atoms or a halogen, and $R_2$ is an alkyl group having from 1 to 6 carbon atoms, in the presence of from 1 to 40 parts by weight of (c) a copolymer of a conjugated diene monomer selected from the group consisting of butadiene and isoprene and an olefinically unsaturated nitrile having the structure

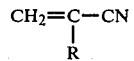

wherein R has the foregoing designation containing from 50 to 95 percent by weight of polymerized conjugated diene and from 50 to 5 percent by weight of polymerized olefinically unsaturated nitrile, said collapsible dispensing tube having connected thereto headpiece means made from a copolymer resulting from the polymerization of 100 parts by weight of (a) at least 50 percent by weight of at least one nitrile having the structure

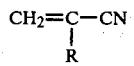

wherein R is hydrogen, a lower alkyl group having from 1 to 4 carbon atoms, or a halogen, and (b) up to 50 percent by weight based on the combined weight of (a) and (b) of an ester having the structure

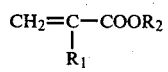

wherein $R_1$ is hydrogen, an alkyl group having from 1 to 4 carbon atoms, or a halogen, and $R_2$ is an alkyl group having from 1 to 6 carbon atoms, in the presence of from 1 to 40 parts by weight of (c) a copolymer of a conjugated diene monomer selected from the group consisting of butadiene and isoprene and an olefinically unsaturated nitrile having the structure

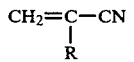

wherein R has the foregoing designation containing from 50 to 95 percent by weight of polymerized conjugated diene and from 50 to 5 percent by weight of polymerized olefinically unsaturated nitrile.

27. The composition of claim 26 wherein the (a) component of the laminated tubular body is methacrylonitrile.

28. The composition of claim 27 wherein there is employed 100 percent by weight of the (a) component of the laminated tubular body.

29. The composition of claim 26 wherein the (a) component of the laminated tubular body is acrylonitrile.

30. The composition of claim 29 wherein the (b) component of the laminated tubular body is ethyl acrylate.

31. The composition of claim 29 wherein the (b) component of the laminated tubular body is methyl acrylate.

32. The composition of claim 31 wherein, in the laminated tubular body, there is employed a mixture of 75 percent by weight of the (a) component and 25 percent by weight of the (b) component.

* * * * *